United States Patent [19]
Bard et al.

[11] Patent Number: 5,486,944
[45] Date of Patent: Jan. 23, 1996

[54] SCANNER MODULE FOR SYMBOL SCANNING SYSTEM

[75] Inventors: Simon Bard, Stony Brook; Askold Strat, Patchogue; Paul Dvorkis, Stony Brook, all of N.Y.

[73] Assignee: Symbol Technologies, Inc., Bohemia, N.Y.

[21] Appl. No.: 302,071

[22] Filed: Sep. 6, 1994

Related U.S. Application Data

[63] Continuation of Ser. No. 61,070, May 14, 1993, abandoned, which is a continuation-in-part of Ser. No. 884,734, May 19, 1992, which is a continuation-in-part of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ .............................. G06K 7/10; G02B 26/10
[52] U.S. Cl. .......................... 359/198; 359/199; 359/214; 359/224; 235/462
[58] Field of Search ..................................... 359/198, 199, 359/214, 224; 348/205; 358/208; 235/462, 470, 472; H04N 3/08

[56] References Cited

U.S. PATENT DOCUMENTS

| | | | |
|---|---|---|---|
| 1,873,696 | 8/1932 | Centeno | 348/205 |
| 2,863,064 | 12/1958 | Rabinow | 250/235 |
| 3,011,124 | 11/1961 | Hermann et al. | 348/205 |
| 3,360,659 | 12/1967 | Young | 250/236 |
| 3,583,792 | 6/1971 | Jones et al. . | |
| 3,610,891 | 10/1971 | Raciazek . | |
| 3,800,084 | 3/1974 | Vrenko | 178/7.6 |
| 3,860,794 | 1/1975 | Knockeart et al. . | |
| 3,925,639 | 12/1975 | Hester . | |
| 3,931,524 | 1/1976 | Herrin | 250/566 |
| 3,978,317 | 8/1976 | Yamaguchi et al. . | |
| 3,978,318 | 8/1976 | Romeo et al. . | |

(List continued on next page.)

FOREIGN PATENT DOCUMENTS

| | | | |
|---|---|---|---|
| 0067414 | 12/1982 | European Pat. Off. . | |
| 0137966 | 4/1985 | European Pat. Off. . | |
| 2208459 | 5/1973 | Germany | G06K 7/14 |
| 56-114136 | 9/1981 | Japan | G11B 7/12 |
| 107116 | 5/1991 | Japan | 359/198 |
| 211217 | 8/1992 | Japan | 359/214 |
| 1674047 | 8/1991 | U.S.S.R. | 359/198 |
| 1120720 | 7/1968 | United Kingdom . | |

OTHER PUBLICATIONS

"A Precision Two–Coordinate One–Mirror Scanning Device" by V. L. Mamaev & B. S. Rosov translated from Pribory i Tekhnika Eksperimenta, No. 1, pp. 227–229 Jan.–Feb. 1976.

Due, "Optical–Mechanical, Active/Passive Imaging Systems—Volume II," Research Institute of Michigan, May 1982, p. 178 (Government Internal).

Wipple, Editor, Article by Barnes, "Thermography", pub. in Thermography and its Clinical Applications, N.Y. Academy of Sci., 1964, p. 37.

Yoder, "Opto–Mechanical System Design," Marcel Dekkew, Ins., 1986, p. 159.

(List continued on next page.)

*Primary Examiner*—John Shepperd

[57] ABSTRACT

An optical scanner module for directing a light beam to scan an optically encoded symbol includes an optical element mounted for oscillatory motion to scan the light beam in one direction by a flex element capable of torsional flexure. This oscillatory motion is induced by the interacting magnetic fields established by a permanent magnet mounted to the flex element and an electromagnetic coil driven by an AC current. Bidirectional light beam scanning is achieved by mounting an assembly of the flex element, optical element and permanent magnet to one or more additional flex elements for oscillatory motion to scan the light beam in a second direction. This oscillatory motion is induced by the inclusion of an additional permanent magnet and/or electromagnetic coil.

4 Claims, 7 Drawing Sheets

U.S. PATENT DOCUMENTS

| | | | |
|---|---|---|---|
| 4,006,343 | 2/1977 | Izura et al. | |
| 4,019,026 | 4/1977 | Nakanishi et al. | |
| 4,072,859 | 2/1978 | McWaters | 250/214 |
| 4,093,865 | 6/1978 | Nickl | 250/566 |
| 4,104,514 | 8/1978 | Sherer et al. | 235/466 |
| 4,113,343 | 9/1978 | Pole et al. | |
| 4,125,765 | 11/1978 | Cowardin et al. | 235/463 |
| 4,160,156 | 7/1979 | Sherer | 235/463 |
| 4,251,798 | 2/1981 | Swartz et al. | 235/462 |
| 4,253,724 | 3/1981 | Minoura et al. | |
| 4,311,384 | 1/1982 | Keene | 356/152 |
| 4,333,006 | 6/1982 | Gorin et al. | 235/457 |
| 4,354,101 | 10/1982 | Hester et al. | 235/463 |
| 4,355,301 | 10/1982 | Isshiki et al. | 340/146.3 D |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/472 |
| 4,409,470 | 10/1983 | Shepard et al. | 235/472 |
| 4,418,276 | 11/1983 | Yatsunami | 235/462 |
| 4,418,277 | 11/1983 | Tremmel et al. | 235/472 |
| 4,460,120 | 7/1984 | Shepard et al. | 235/472 |
| 4,485,350 | 11/1984 | Sato | 330/86 |
| 4,521,678 | 6/1985 | Winter | 235/472 |
| 4,538,895 | 9/1985 | Higgins et al. | 355/3 R |
| 4,560,862 | 12/1985 | Eastman et al. | 235/467 |
| 4,570,057 | 2/1986 | Chadima, Jr. et al. | 235/472 |
| 4,575,625 | 3/1986 | Knowles | 235/472 |
| 4,578,571 | 3/1986 | Williams | 235/472 |
| 4,593,186 | 6/1986 | Swartz et al. | 235/472 |
| 4,639,606 | 1/1987 | Boles et al. | 250/555 |
| 4,655,541 | 4/1987 | Yamazaki et al. | |
| 4,673,805 | 6/1987 | Shepard et al. | 235/472 |
| 4,678,288 | 7/1987 | Lonsdale et al. | 350/432 |
| 4,694,182 | 9/1987 | Howard | 250/566 |
| 4,732,440 | 3/1988 | Gadhok | |
| 4,736,095 | 4/1988 | Shepard et al. | 235/472 |
| 4,758,717 | 7/1988 | Shepard et al. | 235/472 |
| 4,760,248 | 7/1988 | Swartz et al. | 235/472 |
| 4,766,300 | 8/1988 | Cadima, Jr. et al. | 235/472 |
| 4,782,220 | 11/1988 | Shuren | 235/463 |
| 4,794,239 | 12/1988 | Allais | 235/462 |
| 4,816,660 | 3/1989 | Swartz | 235/467 |
| 4,845,350 | 7/1989 | Shepard et al. | 235/472 |
| 4,896,026 | 1/1990 | Krichever et al. | 235/472 |
| 4,897,532 | 1/1990 | Swartz et al. | 235/467 |
| 5,015,831 | 5/1991 | Eastman et al. | 235/462 |
| 5,021,641 | 6/1991 | Swartz et al. | 235/467 |
| 5,168,149 | 12/1992 | Dvorkis et al. | 235/472 |
| 5,276,545 | 1/1994 | Dann et al. | 359/198 |

OTHER PUBLICATIONS

Wolfe & Zissis, "The Infrared Handbook", Environmental Research Institute of Michigan, 1978, 1985, pp. 9–19.

Yajun Li, "Dependence on the Focal Shift on Fresnel Number and f Number", J. Opt. Soc. Am., vol. 72, No. 6, Jun. 1982.

Sze, S. M., "Physics of Semiconductor Devices", Second Edition, 1981.

Zeine, R. A. Jr., "Bureau of Radiological Health (BRH) Report for Microscan MS–1000 Scanner", Sep. 1982.

Affidavit of Richard Zeine, Jul. 9, 1992, filed in Civil Action 92–CV–6278T, United States District Court, W.D.N.Y.

Affidavit of Michael E. Mertel, Aug. 6, 1992, filed in Civil Action 92–CV–6278T, United States District Court, W.D.N.Y.

Laser Scanner (Product Description of Model MS–1000 by Microscan), EDN Dec. 17, 1982, pp. 319–320.

Metroscan II Model SS–100 Bar Code Scanning System, Technical Manual, by Metrologic Instruments, Inc., Oct. 1978, pp. 1–16.

MS131 Laser Data Terminal With Battery Mode and CMOS Memory Options, Operator's Manual, by Metrologic Instruments, Inc., Dec. 1981, Rev. Oct. 1982, all pages.

Metrologic Scanhandler, The MS190 Scanhandler (™), brochure by Metrologic Instruments, Inc., Copyright 1985, all pages.

Spectra–Physics Model SP2001 Specifications and Brochure, by Spectra–Physics, Inc., Copyright 1984, all pages.

Philips Lehrbriefe—Elektrotechnik und Elektronik (1976).

SCANNER MODULE FOR SYMBOL SCANNING SYSTEM

REFERENCE TO RELATED APPLICATIONS

This application is a file wrapper continuation of application Ser. No. 08/061,070, filed May 14, 1993 now abandoned, which was a continuation-in-part of application Ser. No. 07/884,734, filed May 15, 1992 which in turn is a continuation-in-part of Ser. No. 868,401 filed on Apr. 14, 1992, which issued as U.S. Pat. No. 5,280,165 which is a division of application Ser. No. 520,464, filed May 8, 1990, which issued as U.S. Pat. No. 5,168,149, which is a continuation-in-part of application Ser. No. 428,770, filed on Oct. 30, 1989, which issued as U.S. Pat. No. 5,099,110.

This application is also related to Ser. No. 740,244, filed Aug. 5, 1991, which issued as U.S. Pat. No. 5,206,492, which is a division of Ser. No. 428,770; Ser. No. 08/108,521 filed Jul. 19, 1993, which is a division of Ser. No. 868,401; Ser. No. 789,705 filed on Nov. 8, 1991, which is also a continuation in part of Ser. No. 520,464; and application Ser. No. 812,923, filed on Dec. 24, 1991, which is also a continuation-in-part of Ser. No. 520,464.

BACKGROUND OF THE INVENTION

A. Field of the Invention

The present invention relates to scanning systems which "read" indicia, for example, barcode symbols, having parts with different light reflectivities and, in particular, to a scanner module for directing a beam of light in a predetermined scanning pattern at a barcode symbol and directing light reflected form the barcode symbol to an optical detector.

B. Discussion of the Related Art

Various optical readers and optical scanning systems have previously been developed for reading barcode symbols appearing on a label, or on the surface of an article. The barcode symbol itself is a coded pattern of indicia. Generally, scanning systems electro-optically transform the graphic indicia of the symbols into electrical signals which are decoded into alphanumeric characters. The resulting characters describe the article and/or some characteristic of the article to which the symbol is attached. Such characters typically comprise input data to a data processing system for applications in point-of-sale processing, inventory control, and the like.

As used in this specification and in the following claims, the terms "symbol," "barcode," and "barcode symbol" are used to denote a pattern of variable-width bars separated by variable-width spaces. The foregoing terms are intended to be broadly construed to cover many specific forms of one- and two-dimensional patterns including alphanumeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in U.S. patent application Ser. No. 07/461,881 filed Jan. 5, 1990, commonly assigned to the assignee of the present invention, and hereby incorporated by reference.

Scanning systems have been disclosed, for example, in U.S. Pat. Nos. 4,251,798; 4,369,361; 4,387,297; 4,409,470; 4,760,248; 4,896,026, all of which have been assigned to the assignee of the present invention. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered from the symbol. The photodetector or sensor is positioned in the scanner in an optical path so that it has a field of view which extends at least across and slightly beyond the boundaries of the symbol. A portion of the light beam reflected from the symbol is detected and converted into a pulse-width modulated signal which is decoded, based upon the specific symbology used for the symbol, into a binary data representation of the data encoded in the symbol. The binary data may then be subsequently decoded into the alphanumeric characters represented by the symbol.

Overall performance of a scanning system in reading symbols is a function of the optical capabilities of the scanning mechanism in directing a light beam at a target symbol and resolving the reflected light, and a function of the electronic subsystems which convert and process the information contained in the reflected light. A measure of the overall performance of a barcode symbol scanning system is its ability to resolve the narrowest elements of a barcode symbol and its ability to decode symbols located perhaps hundreds of inches away from the scanning system.

An important component of any scanning system is the scanner module which directs a well-defined light beam in a predetermined beam pattern at the barcode symbol and directs the reflected light from the barcode symbol to a suitable photodetector. The beam pattern that scans the barcode symbol can take a variety of forms, such as repeated line scan, standard raster scan, jittered raster scan, fishbone, petal, etc. These beam patterns are generated by controlled motions of one or more optical elements in the beam path. Typically, the optical element includes a mirror that is driven by some form of scanning motor to periodically deflect the beam through the desired beam scanning pattern. For a repeated line scan beam patter, a polygonal mirror undirectionally rotated by a simple motor can be utilized. For more complex beam patterns, more involved drive mechanisms are required.

The frequency at which the beam pattern is executed is also an important consideration. The more times a barcode symbol can be scanned in a given time period, the chances of obtaining a valid read of the barcode symbol are increased. This is particularly important when the barcode symbols are borne by moving objects, such as packages travelling on a conveyor belt.

Many applications call for a handheld scanning system, where a user aims a light beam at the barcode symbol, and the beam executes a scan pattern to read the barcode symbol. For such applications, the scanner module must be compact in order to be accommodated in a handheld package which may be pistol-shaped. Moreover, such scanners must be lightweight and structurally robust to withstand physical shock resulting from rough handling. It is also desirable that the scanner module consume minimal power during operation.

SUMMARY OF THE INVENTION

It is accordingly an object of the present invention to provide an improved optical scanner module for utilization in a scanning system for reading a data-encoded symbol. The optical scanner of the present invention is compact, lightweight, durable and efficient in construct and operation, and thus is ideally suited for portable handheld applications.

Thus in accordance with the present invention, an optical element and a first permanent magnet are mounted to a first elongated flex element which, in turn, is mounted to position the optical element in the optical path of a light beam aimed at the data-encoded symbol. The first flex element, first permanent magnet, and optical element assembly is, in turn, mounted, together with a second permanent magnet, by a second flex element.

To produce bidirectional scanning motion of the optical element, control signals in the form of AC drive signals are applied to electromagnetic coil means to generate a magnetic field interacting with the magnetic fields of the first and second permanent magnet. The magnetic axes of the interacting magnetic fields are relatively oriented to produce oscillatory motions of the optical element in a first direction about the axis defined by the first flex element and in a second direction about the axis defined by the second flex element.

Additional features and advantages of the present invention will be set forth in the description which follows, and in part will be apparent from the description, or may be learned from practice of the invention. The objectives and advantages of the invention will be realized and attained by the apparatus particularly pointed out in the written description and claims hereof, as well as the appended drawings.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

BRIEF DESCRIPTION OF THE DRAWINGS

For a full understanding of the present invention, reference may be had to the following Detailed Description taken in conjunction with the accompanying drawings, in which.

Like reference numerals refer to corresponding parts throughout the several views of the drawings.

DETAILED DESCRIPTION

Figure 1:
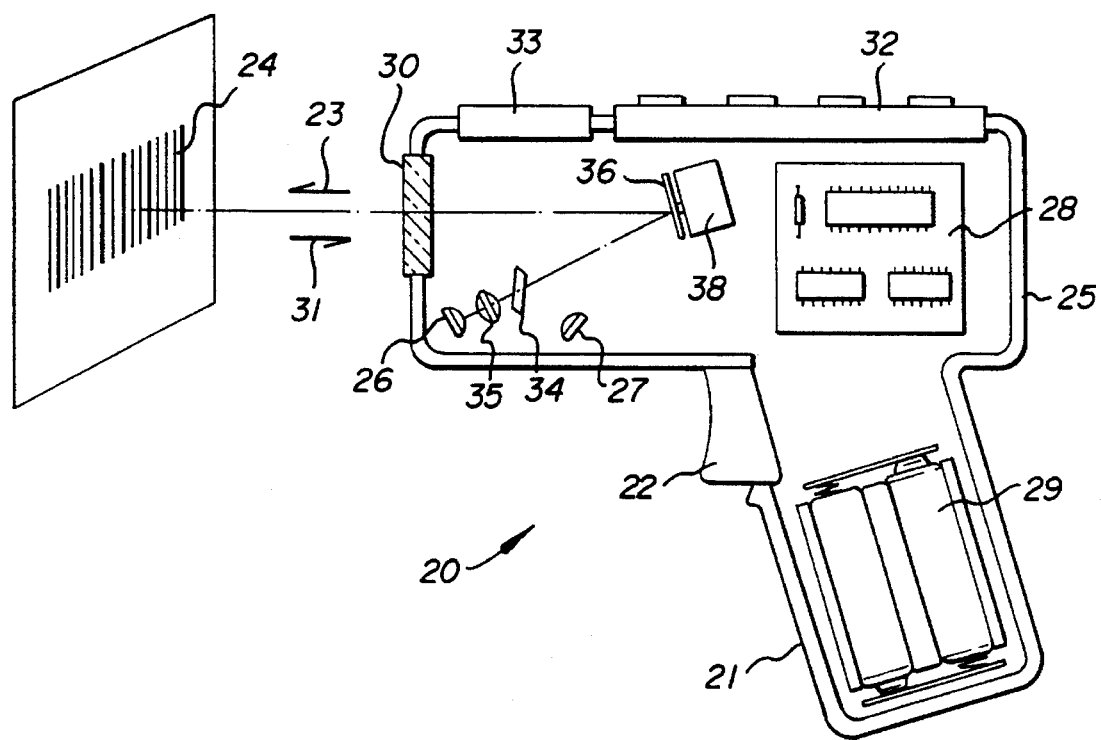
FIG. 1 is a schematic diagram of a handheld optical scanning system for reading a barcode symbol and incorporating a scanner module of the present invention.

FIG. 1 illustrates a portable pistol-shaped scanning system, generally indicated at 20, to which the scanner module of the present invention is particularly suited. Scanning system 20 has a pistol-grip type handle 21, and a manually-actuated trigger switch 22 which allows the user to activate a light beam 23 after the user has positioned the scanning system to a point on a symbol 24. A lightweight plastic housing 25 contains a laser light source 26, detector 27, optics and signal processing circuitry 28, and power source or battery 29.

A light-transmissive window 30 in the front end of housing 25 allows outgoing light beam 23 to exit and incoming reflected light 31 to enter. Scanning system 20 is designed to be aimed at barcode symbol 24 by a user from a position in which the scanning system is spaced from the symbol or moving across the symbol. Typically, this type of handheld scanning system is specified to operate at a range of greater than several inches. Scanning system 20 may also function as a portable computer terminal, and in such embodiments includes a keyboard 32 and a display 33, such as described in the previously noted U.S. Pat. No. 4,409,470.

As further depicted in FIG. 1, a beam splitter 34, or a suitable multiple lens system, may be used to focus the light beam into a scanning spot in an appropriate reference plane at the predetermined location. Light source 26, such as a semiconductor laser diode, is positioned to introduce a light beam along the axis of a lens 35, and the beam passes through partially-silvered, beam splitting mirror 34 and other lenses or beam-shaping structure as needed. The beam is reflected by an oscillating mirror 36 of a scanner module of the present invention, which is generally indicated at 38. The scanner module is energized when trigger 22 is pulled. If the light produced by source 26 is marginally visible, an aiming light may be included in the optical system. The aiming light, if needed, produces a visible-light spot which may be fixed or scanned like the laser beam. A user employs this visible light to aim the scanning system at the symbol before pulling the trigger.

Figure 2:
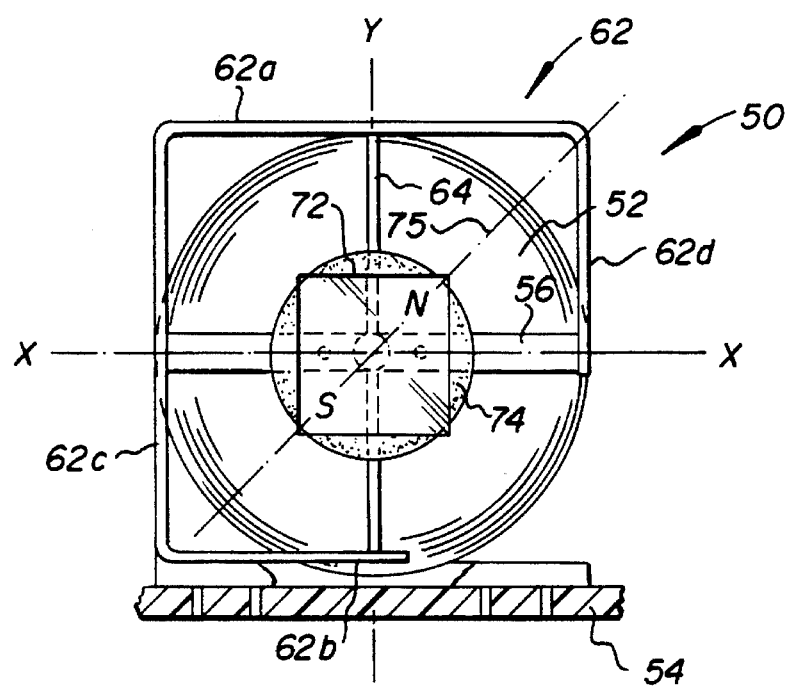
FIGS. 2 and 3 are front and side views, respectively, of a two-directional scanner module constructed in accordance with one embodiment of the present invention.
Figure 3:
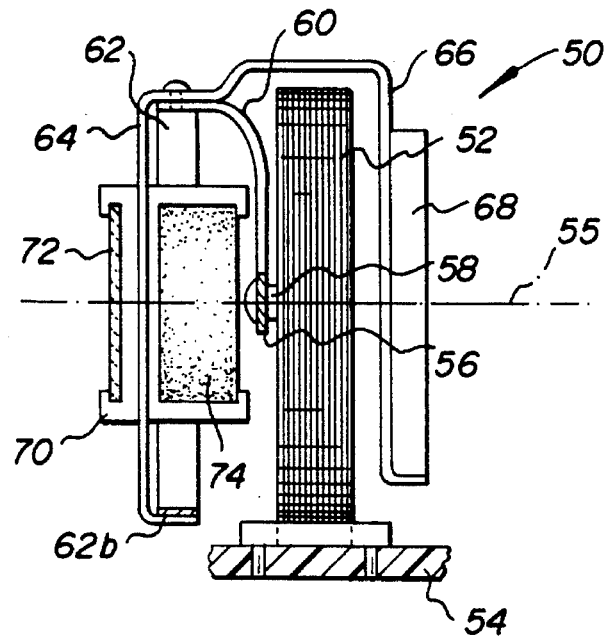

In the embodiment of the invention seen in FIGS. 2 and 3, a scanner module, generally indicated at 50, includes an electromagnetic coil 52 mounted in vertical orientation on a suitable stationary base, such as a circuit board 54, to orient a horizontal magnetic axis 55 coincident with the coil centerline. A horizontal flex element 56 is affixed at opposite ends to standoff mounts 58 attached at diametrically opposed locations on coil 52. This mounting of flex element 56 is such as to place it in a taut condition. The taut flex element may be formed of any suitable strip material, such as polyamide or polyester plastic film. KAPTON® and MYLAR® plastic films marketed by Dupont Corporation are highly suitable materials for taut band element 56.

Affixed to taut band element 56 at a location centered on magnetic axis 55 is the lower end of a bracket 60, whose upper end is fastened to an upper horizontal side 62a of a generally rectangular frame 62. This frame, which is mounted in suspension by bracket 60, includes a short, lower horizontal side 62b integrally joined with side 62a by a full length left vertical side 62c and a short right vertical side 62d depending from the right end of full length upper side 62a. A vertical flex element 64 is secured at its upper end to a mid-length point of frame side 62a and at its lower end to frame side 62b. Frame 62 is formed of a suitable metallic spring stock, such as beryllium copper, such that it can stretch flex element 64 to a taut condition. Suitable materials for flex element 64 are beryllium copper and steel wire. As seen in FIG. 3, taut band element 56 also cantilever mounts, via bracket 60, a secondary L-shaped bracket 66 having a vertical segment depending rearwardly of coil 52 and serving to mount a mass 68 for counter-balancing the mass of the frame and a mirror-magnet assembly to be described. By proper selection of mass 68, torsional forces on taut band element 56 can be reduced essentially to zero while the scanning module is in a quiescent state.

Still referring to FIGS. 2 and 3, a carrier 70 is affixed to taut wire element 64 in a position centered on magnetic axis 55 of coil 52. This carrier mounts a mirror 72 forwardly of taut wire element 24 and a permanent magnet 74 rearwardly of the taut wire element. The permanent magnet is in the form of a cube and is polarized along a magnetic axis 75 oriented at an oblique angle, e.g. 45°, with respect to indicated X and Y axes. Thus, for example, permanent magnet 74 is polarized such that north pole N is generally located at the upper right corner and south pole S at the lower left corner of the magnet cube, as seen in FIG. 2.

It is seen from the foregoing description that mirror 72 can oscillate about the Y axis through taut wire element 64 with torsional flexure of this flex element to deflect a laser beam in an X scanning direction. Also, the mirror can oscillate about the X axis through taut band element 56 with torsional flexure of this flex element to deflect the laser beam in a Y scanning direction. With the magnetic axis 75 of the single permanent magnet 74 obliquely oriented, X and Y mirror scanning motions can be driven by energizing of the single electromagnetic coil 52.

In accordance with a feature of the invention, by utilizing a flex element in the form of taut wire element 64 and controlling the mass of the mirror-magnet assembly, the resonant frequency for X scanning motion can be established at a relative high frequency, e.g., 500 Hz. Then, by utilizing a flex element in the form of taut band element 56 with the considerably greater mass supported by this flex element, as compared to taut wire element 64, a resonant frequency for Y scanning motion can be established at a considerably lower frequency, e.g., 20 Hz. By virtue of this wide separation between resonant frequencies, if the electromagnetic coil is energized with an AC current of 500 Hz, the interaction of the magnetic fields of the coil and permanent magnet 74 produces mirror oscillations essentially only about the Y axis and thus beam scanning motion only in the X direction. On the other hand, when the coil is energized with an AC current of 20 Hz, the interaction of the coil and magnet fields produces mirror oscillation essentially only about the X axis through taut band element 56, and thus beam scanning motion only in the Y direction. However, when electromagnetic coil 52 is driven with superimposed 500 Hz and 20 Hz AC currents, mirror oscillates about both the X and Y axes to produce beam scanning motion components in both the X and Y directions. Such current superimposition can be achieved by producing a 20 Hz amplitude modulation of a 500 Hz AC drive current. Variable modulation of this drive current in amplitude and/or frequency can then produce a variety of laser beam scan patterns, including those patterns illustrated in application Ser. No. 07/981,448, cited above. The disclosure of this application, as well as the disclosures of the other cited applications, are incorporated herein by reference, The embodiment of the invention seen in FIG. 4 comprises a two-directional scanner module, generally indicated at 80, which includes an electromagnetic coil 82 mounted to stationary base 84 in vertical orientation to establish a horizontal magnetic axis 85. A ring 86 is mounted to the electromagnetic coil by a pair of flex elements in the form of leaf springs 88 at diametrically opposed three and nine o'clock positions. These leaf springs lie in a horizontal plane and thus are flexible in the vertical or Y direction. A vertically oriented flex element 90, in the form of a band of plastic film material or a wire, as utilized in the embodiment of FIGS. 2 and 3, is fixed at one end to ring 86 at a twelve o'clock position and at its other end to the ring at a six o'clock position. The band is stretched tight such as to function as a taut flex element.

A mirror 92 is mounted to the front side of taut flex element 90, and a permanent magnet 94 is mounted to the back side of the taut band element. The mounting of the mirror and permanent magnet is centered on horizontal magnetic axis 85. Permanent magnet 94 is magnetized in the horizontal direction to establish a magnetic axis 95 which is normal to the magnetic axis 85 of electromagnetic coil 82.

When the electromagnetic coil is energized with an AC current, the magnetic fields of the electromagnetic coil and permanent magnet interact to produce forces causing the mirror-magnet assembly to oscillate in the horizontal direction as taut band element 90 flexes in torsion. A laser beam impinging on the mirror is thus deflected in a horizontal or X scanning direction. The same magnetically induced forces that generate X direction scanning motion attempt to produce a similar motion of ring 86. Due to the stiffness of the leaf spring suspension mounting of the ring, the horizontal component of the magnetically induced forces can not produce horizontal oscillation of the ring. However, tensile and compressive stresses are induced in leaf springs 88, which produce vertical force components effective to create a vertical moment causing the ring to move in the vertical direction. The frequency of the up and down oscillation in the Y direction is determined by the mass of the ring assembly (ring, taut flex element, mirror and permanent magnet) and characteristics of the leaf springs, e.g., elasticity, dimensions, etc.

It is thus seen that, by virtue of the flexible mounting of the ring assembly to accommodate vertical motion, scanner module 80 is capable of bidirectional, e.g., X and Y, oscillation to produce raster scanning of a laser beam deflected by mirror 92. Permanent magnet 94 is illustrated as having a cubic shape with a minimized horizontal dimension to reduce its inertial moment about the Y axis. Thus horizontal oscillations of the mirror can be induced with less drive current power applied to the electromagnetic cord.

Figure 4:
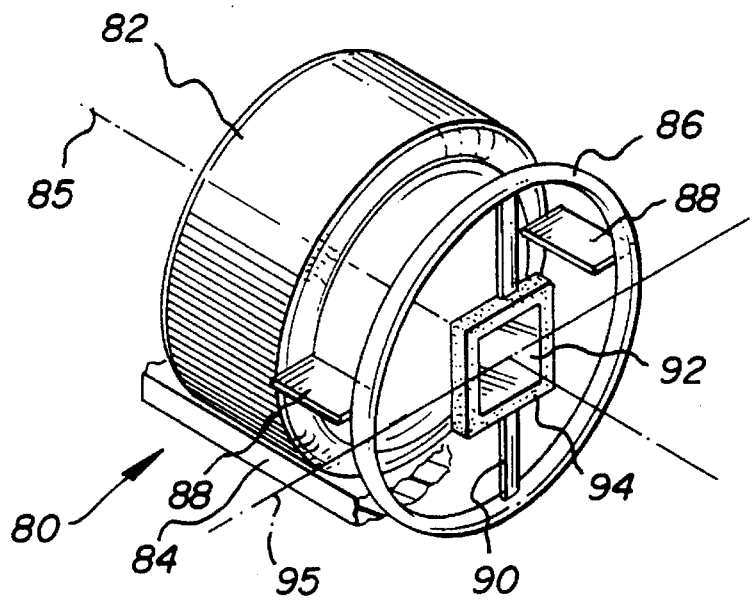
FIG. 4 is a perspective view of a two-directional scanner module constructed in accordance with a second embodiment of the present invention.
Figure 5:
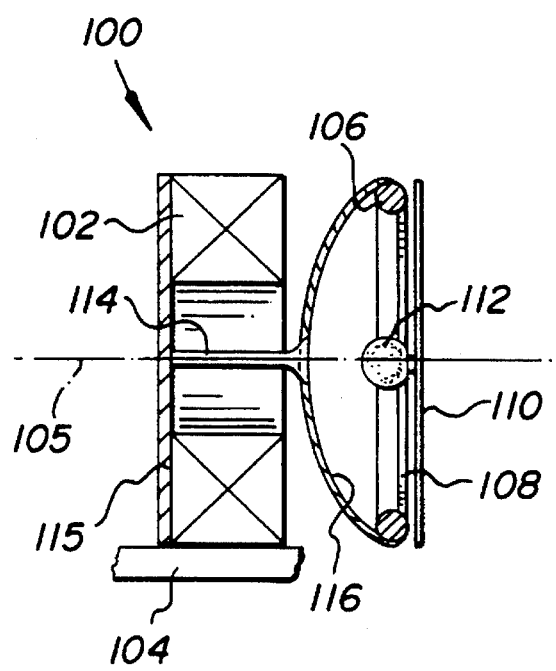
FIG. 5 is a longitudinal sectional view of a two-directional scanner module constructed in accordance with a third embodiment of the present invention.

In the embodiment of the invention seen in FIG. 5, a scanner module, generally indicated at 100, includes an electromagnetic coil 102 vertically mounted to a stationary base 104 to establish a horizontally oriented magnetic axis 105. As in scanner module 80 of FIG. 4, scanner module 100 utilizes an ring assembly including a ring 106 mounting a vertical taut band element 108 which, in turn, mounts in back-to-back relation a forward mirror 110 and a rearward permanent magnet 112 in centered relation with magnetic axis 105. Again, permanent magnet 112 is polarized in the horizontal direction to orient a magnetic axis (not shown) orthogonal to magnetic axis 105. As a modification to scanner module 80 of FIG. 4, scanner module 100 utilizes a single flexible member to mount the ring assembly. Thus, as seen in FIG. 5, a flex member 114, flexible in the vertical direction and stiff in the horizontal direction, is affixed at a rearward end to an upright extension 115 of base 114 located to the rearward side of electromagnetic coil 102. Flex member 114 extends forwardly through the open center of the electromagnetic coil 102 in aligned relation with magnetic axis 105 to a frontal end to which the ring assembly is mounted by way of bracketing 116.

As in the case of scanner module 80 of FIG. 4, AC current drive of electromagnetic coil 102 of scanner module 100 in FIG. 4 produces horizontal oscillation of mirror 110 with torsional flexure of taut band element 108 and the ring assembly oscillates in the vertical direction on the cantilever mounting provided by central flex member 114. Thus, scanner module 110 also provides bidirectional, X and Y raster scanning motion of a laser beam utilizing a single electromagnetic coil and a single permanent magnet.

Figure 6:
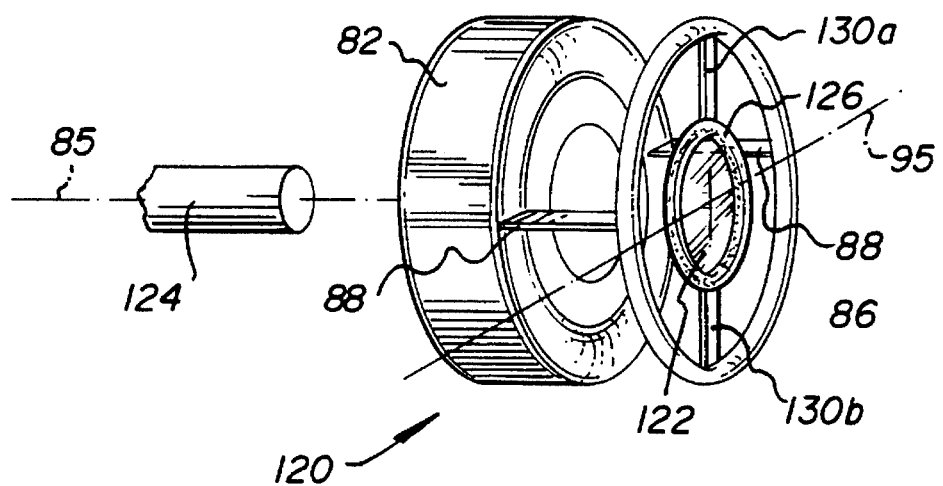
FIG. 6 is a perspective view of a two-directional scanner module constructed in accordance with a fourth embodiment of the invention.

Rather than utilizing an oscillating mirror to produce laser beam scanning, as in the scanner module embodiments described above, laser beam scanning can be effected utilizing an oscillating lens. Thus, as seen in FIG. 6, a scanner module, generally indicated at 120, utilizes the same ring assembly suspension mounting approach of scanner module 80 of FIG. 4. Thus, ring 86 is mounted to vertically oriented electromagnetic coil 82 by a pair of leaf springs 88 at the three and nine o'clock positions. The ring, in turn, mounts a lens 122 whose optical center is aligned with the magnetic axis 85 of electromagnetic coil 82. A laser 124 is positioned to emit a beam along magnetic axis 85 and through lens 122. So as not to obstruct the laser beam, the lens is mounted along its peripheral edge to a ring-shaped permanent magnet 126 and the magnet, in turn, is mounted to ring 86 by a pair of vertically aligned, short, taut band elements 130a and 130b. Taut band element 130a is connected between the twelve o'clock positions of the ring and ring magnet, and taut band element 130b is connected between the six o'clock positions of the ring and ring magnet. The permanent ring magnet is polarized in the horizontal direction, as illustrated, to establish a magnetic axis 95 orthogonal to magnetic axis 85. AC drive current applied to the electromagnetic coil produces X and Y directional oscillations of lens 122, as in the case of mirror 82 in FIG. 4, to achieve pre-objective scanning of the laser beam in X and Y directions.

Figure 7:
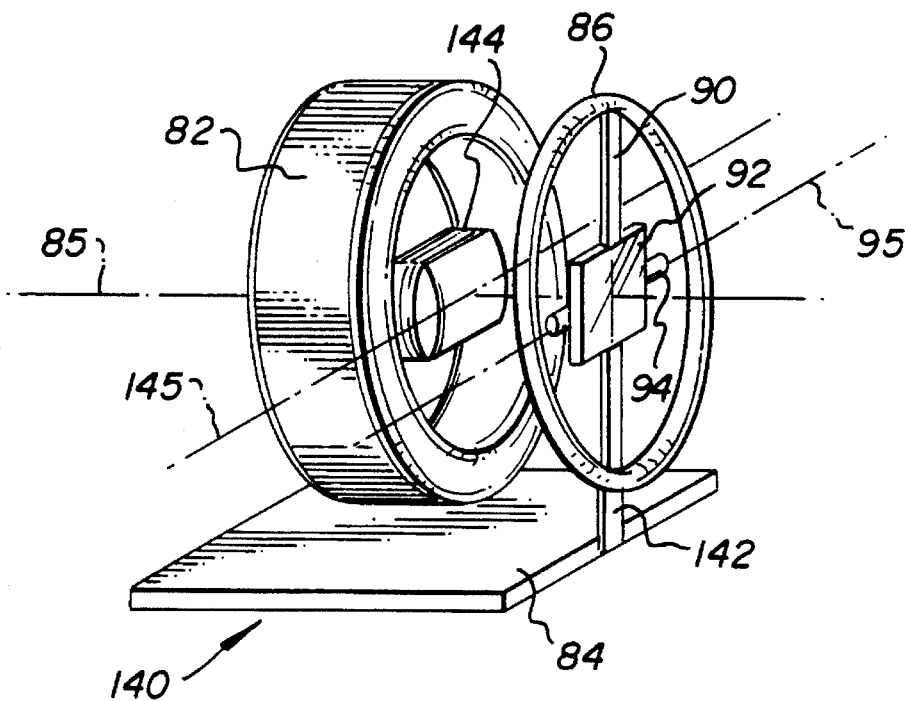
FIG. 7 is a perspective view of a two-directional scanner module constructed in accordance with a fifth embodiment of the invention.

Two-directional scanning is also achieved by the scanner module, generally indicated at 140 in FIG. 7. In this embodiment of the invention, an electromagnetic coil 82 is again mounted in upright orientation to a stationary base 84. As in the case of scanner module 80 (FIG. 4), a ring assembly is utilized, composed of a ring 86 mounting a vertically oriented taut band element 90, with a frontal mirror 92 and reward permanent magnet 94 centrally mounted to the taut band element. However in this embodiment, the ring assembly is mounted in vertical orientation directly to base 84 by a single, vertical flex member 142 which allows the ring assembly to rock fore and aft generally along magnetic axis 85 of the electromagnetic coil 82. This rocking motion is seen to produce oscillatory motion of mirror 92 in the vertical or Y direction in the manner provided by the horizontal flex mounting elements of FIGS. 4–6.

To induce this vertical oscillation of mirror 92, a second stationary electromagnetic coil 144 is situated within the central opening of electromagnetic coil 82 with its magnetic axis 145 oriented perpendicular to axis 85 of coil 82. This magnetic axis 145 is parallel to magnetic axis 95 of permanent magnet 94. Thus, when electromagnetic coil 144 is driven by an AC current, permanent magnet 94 is alternately attracted toward and repelled from the coil 144. The ring assembly is thus rocked fore and aft on flex mount 142, and vertical components of oscillation of mirror 92 are produced. As in the case of the embodiments of FIGS. 4–6, horizontal or X direction oscillation of the mirror is induced by AC current energization of electromagnetic coil 82.

It will be appreciated that flex mount 142 may be implemented as an extension of taut band element 90. Also, electromagnetic coil 144 may be provided as a continuation of the winding for electromagnetic coil 82, which is wound on a horizontal cross member of a bobbin for coil 82. As an additional feature, scanner module 140 of FIG. 7 possesses two resonances for oscillations in the horizontal or X direction. Torsional oscillation on taut band element 90 will resonate at a high frequency, while torsional oscillation on flex member 142 will resonant at a low frequency.

Figure 8:
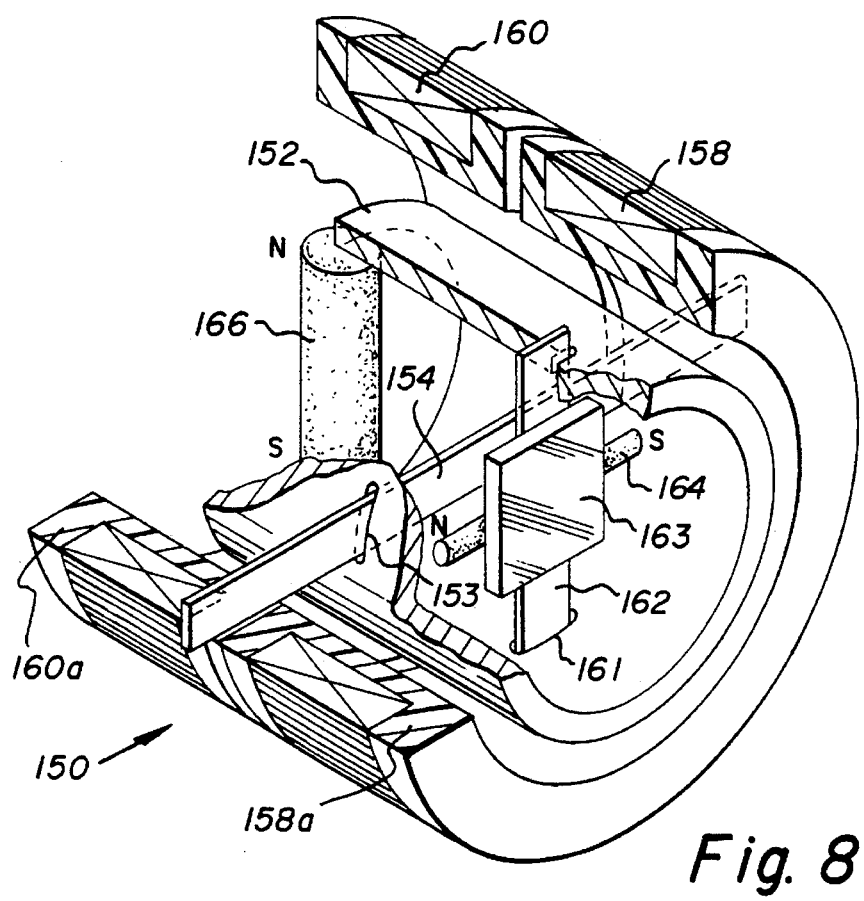
FIG. 8 is a perspective view of a two-directional scanner module constructed in accordance with a sixth embodiment of the present invention.

Turning to FIG. 8, another embodiment of the invention is illustrated in the form of a scanner module, generally indicated at 150, which includes a cylinder 152, formed of a non-magnetic material, which is provided with horizontally opposed slits 153 through with an elongated flex element 154 extends. This flex element, which is in the form of a strip of flexible material, such as spring steel, has opposed ends fixedly mounted between bobbins 158a and 160a on which an X deflection electromagnetic coil 158 coil and a Y deflection electromagnetic coil 160 are respectively wound.

Cylinder 152 is also formed with forwardly located, vertically opposed slits 161 in which ends of an elongated vertical flex element 162 are captured. This flex element 162 is typically formed of the same material as flex element 156. A mirror 163 is mounted to the front side and a permanent magnet 164 is mounted to the back side of flex element 162 in positions centered on the centerline of cylinder 152, which coincides with the magnetic axes of electromagnetic coils 158 and 160. A second, vertically oriented permanent magnet 166 is mounted to the rearward end of cylinder 152. As illustrated, permanent magnet 166 is polarized in the vertical direction and is positioned such that its magnetic field, having a vertically oriented axis, can interact with the magnetic field produced by electromagnetic coil 160, whose axis is horizontal and thus orthogonal thereto. Permanent magnet 164 is polarized in the horizontal direction and is positioned such that its magnetic field can interact with the orthogonally related magnetic field produced by electromagnetic coil 158.

By virtue of this construction of scanner module 150, it is seen that AC drive current applied to electromagnetic coil 158 produces a magnetic field that interacts with the magnetic field of permanent magnet 164 to produce horizontal oscillations of mirror 162, and thus laser beam scanning in the X direction, as vertical flex element 162 flexes in torsion. AC current drive of electromagnetic coil 160 then produces a magnetic field which interacts with the magnetic field of permanent magnet 166 to produce vertical oscillations of the mirror and laser beam scanning in the Y direction as horizontal flex element 154 flexes in torsion. Thus, a bidirectional raster scan of the laser beam is achieved. Since the mass supported by horizontal flex element 154 is greater that the mass supported by vertical flex element 162, the resonant frequency of horizontal oscillations is higher than the resonant frequency of vertical oscillations. It will be appreciated that, by providing separate horizontal and vertical coil-magnet sets, X and Y directional scanning can be readily controlled to create a wide variety of laser beam scan patterns.

Figure 9:
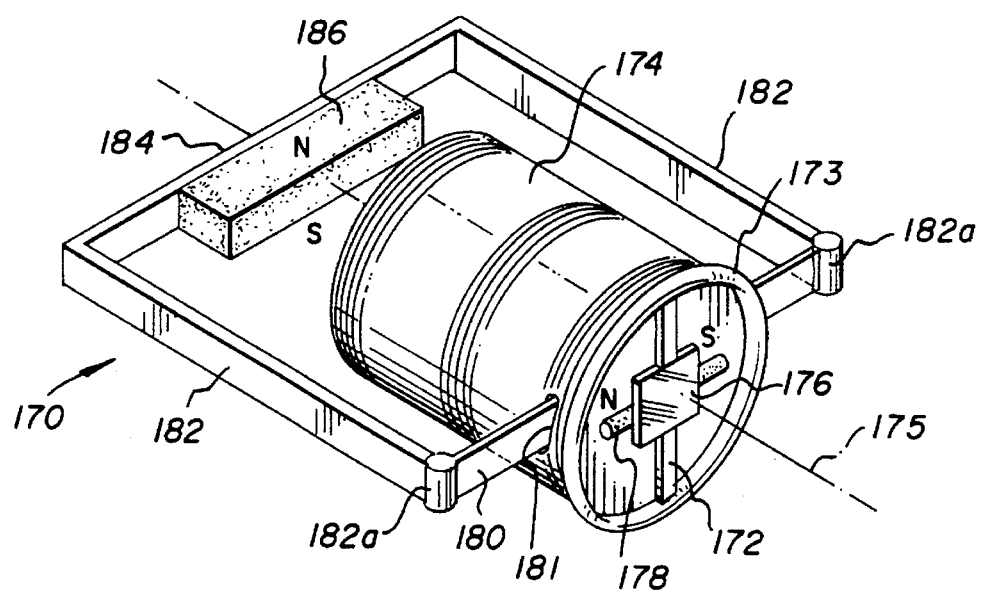
FIG. 9 is a perspective view of a two-directional scanner module constructed in accordance with a seventh embodiment of the invention.

In the embodiment of the invention seen in FIG. 9, a scanner module, generally indicated at 170, includes a taut band element 172 affixed in vertical orientation to the forward end of a bobbin 173 of an electromagnetic coil 174. Affixed to the front side of this taut band element is a mirror 176, and a permanent magnet 178 is affixed to the back side thereof. An elongated flex member 180 extends through horizontally opposed slits 181 in bobbin 173 with opposite ends anchored to the front ends 182a of longitudinally extending arms 182 of a U-shaped, stationary bracket having a transverse base 184 interconnecting the rearward ends of the arms. A permanent magnet 186 is secured to the bracket base and is polarized in the vertical direction to establish a vertically oriented magnetic axis. Permanent magnet 178 is polarized in a transverse or horizontal direction to establish a magnetic axis that is orthogonal to both magnetic axes of permanent magnet 186 and to the longitudinal magnetic axis 175 of electromagnetic coil 174. The mounting position of the mirror-magnet assembly on taut band element 172 is centered on electromagnetic coil axis 175.

In operation, upon AC current energization of electromagnetic coil 174, mirror 176 is oscillated in the horizontal direction as the result of the interaction of the orthogonally related magnetic fields of the electromagnetic coil and permanent magnet 178. This oscillation in the X direction is accommodated by torsional flexure of taut band element 172. Concurrently, the bobbin mounted mirror oscillates in the vertical direction by virtue of the interaction of the orthogonally related magnetic fields of the electromagnetic coil and permanent magnet 186, as permitted by torsional flexure of flex member 180. Thus bidirectional laser beam scanning motion is produced utilizing a pair of permanent magnets and a single electromagnetic coil. Again resonance for oscillation in the X direction is at a higher frequency than the resonant frequency for oscillation in the Y direction. It will be appreciated that the coil winding on bobbin 122 may be a split coil with forward and rearward coil portions driven separately to produce the desired horizontal and vertical components of oscillatory mirror motion for a variety of bidirectional scan patterns executed by a laser beam.

Figure 10:
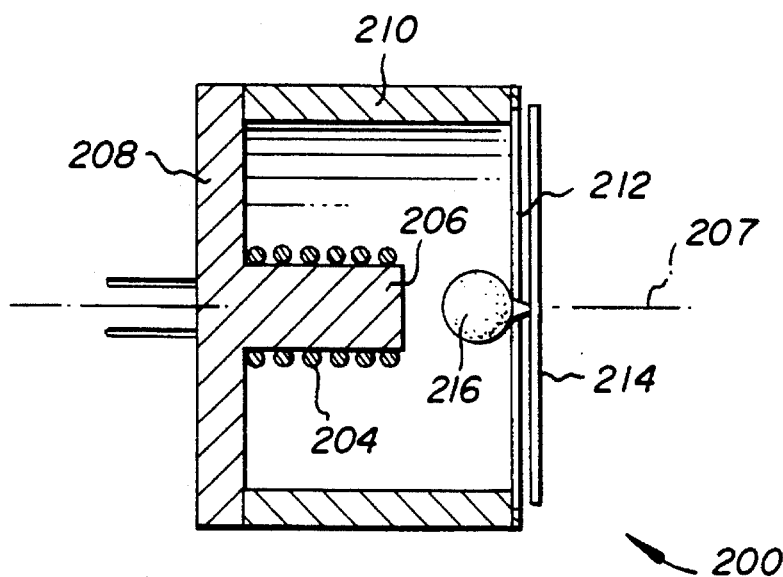
FIG. 10 is a longitudinal sectional view of a one-directional scanner module constructed in accordance with an eight embodiment of the present invention.

In the embodiments of the invention described above, the electromagnetic coils are of the air core type. In the scanner module embodiments 200 and 202 illustrated in FIGS. 10 and 11, respectively, an electromagnetic coil 204 is wound on a metallic core 206 of high magnetic permeability. The core is mounted to or integrally formed with a circular base 208 of like material. A cylinder 210 of magnetically permeable metal is joined at its rearward end to base 208 in coaxial relation with core 206. An elongated flex member 212 in the form of a taut band or taut wire element is affixed to span the forward end of cylinder 210 from twelve to six o'clock positions. Affixed to this vertical flex element is a frontal mirror 214 and a rearward permanent magnet 216 in positions centered on centerline 207 of core 206. The permanent magnet is polarized in a horizontal direction into and out of the drawing sheet.

Figure 11:
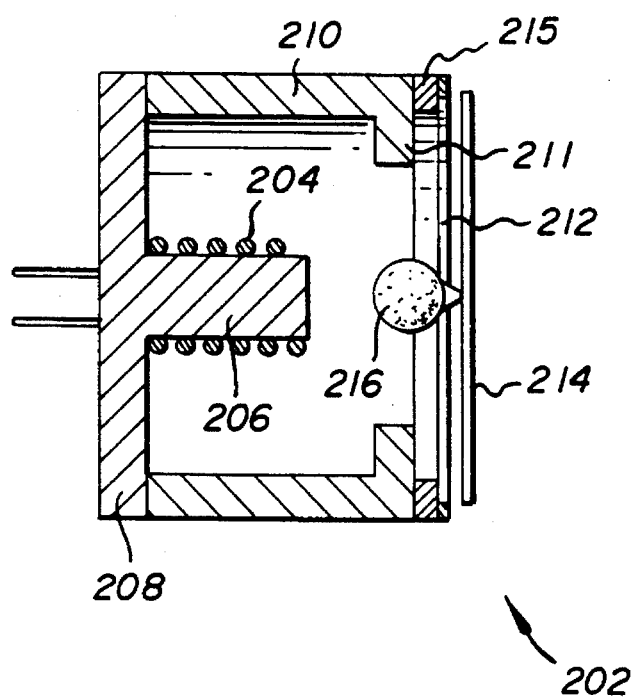
FIG. 11 is a longitudinal sectional view of a one-directional scanner module constructed in accordance with a ninth embodiment of the invention.

It is seen that a closed magnetic path is provided to concentrate the magnetic filed generated by AC current energization of electromagnetic coil 204 in the air gaps between the forward ends of the core and cylinder. The coupling efficiency of the magnetic fields of the permanent magnet and electromagnetic core is thus enhanced. The interaction of these magnetic fields is increased to generate enhanced torsional forces producing horizontal or X direction oscillations of mirror 214. Consequently, scanner modules 200 and 202 require less power to oscillate the mirror, a significant advantage in portable applications. FIG. 11 illustrates that the forward end of cylinder 210 may be turned radially inward to present an annular pole piece 211 in closer proximity to permanent magnet 216 and core 206. Also, FIG. 11 illustrates that flex member 212 may be mounted to a ring 215, of a rigid plastic for example, and ring then affixed to the front end of cylinder 210. This standoff mounting provides clearance between the flex member and pole piece 211, as well as simplifying manufacturing and assembly procedures.

Figure 12:
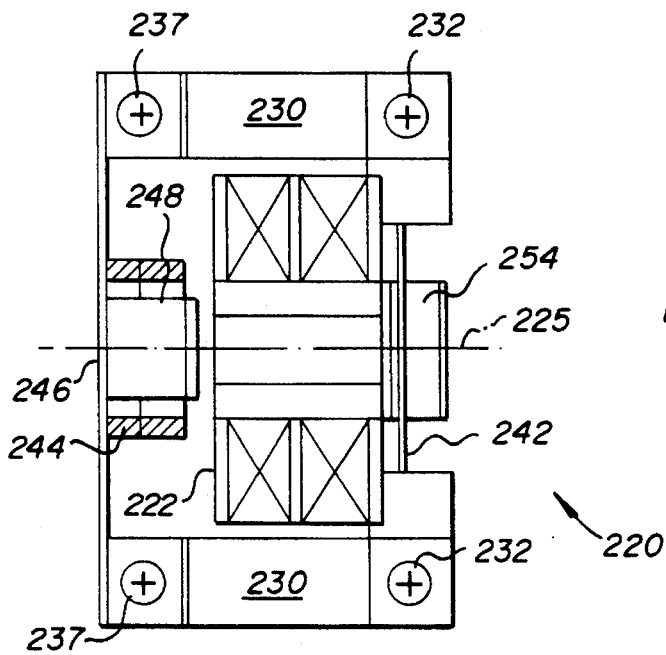
FIGS. 12, 13 and 14 are plan, front and side views, respectively, of a two-directional scanner module constructed in accordance with a tenth embodiment of the present invention.
Figure 13:
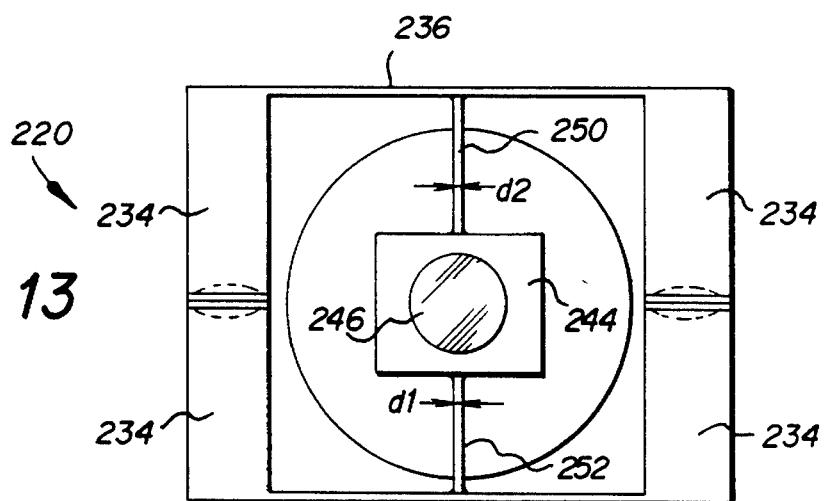
Figure 14:
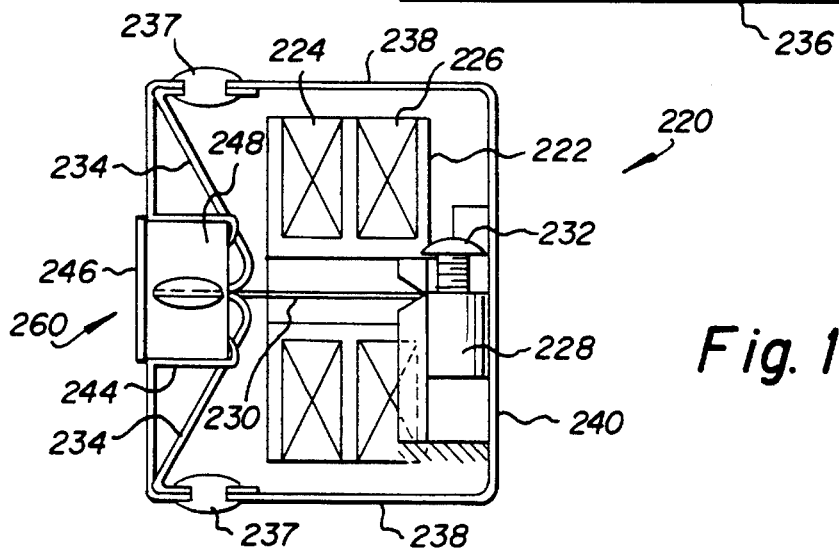

In the embodiment of the invention seen in FIGS. 12–14, a scanner module, generally indicated at 220, includes a stationary dual bobbin 222 on which are wound a forward electromagnetic coil 224 and a rearward electromagnetic coil 226. The magnetic axes of these coils are indicated at 225. A pair of transversely aligned, fixed mounting posts 228, positioned in flanking relation with bobbin 222, respectively serve to anchor the rearward ends of a pair of flex elements 230 via clamping screws 232. The front ends of these flex elements are clamped between horizontally turned inner foot portions of vertically oriented pairs of Z-shaped front frame members 234, with each vertical pair being interconnected by upper and lower cross frame members 236 as seen in FIG. 13. Horizontally turned outer foot positions of front frame members 234 are secured, as indicated at 237, to U-shaped frame members having forwardly extending upper and lower arms 238 joined by vertically oriented, rear frame members 240. The transversely spaced rear frame members are interconnected by a cross frame member 242 at a position vertically centered with magnetic axis 225.

A holder 244 is provided to carry a mirror 246 at a front end and a permanent magnet 248 at a rear end. As best seen in FIG. 13, a first vertically oriented flex element 250 is anchored at its upper end to upper cross frame member 236 and anchored at its lower end to the upper side of holder 244. A second vertically oriented flex element 252 is anchored at its upper end to the lower side of holder 244 and anchored at its lower end to lower cross frame 236. The flex elements 250 and 252 mount holder 244 such that mirror 246 and permanent magnet 248 are centered on magnetic axis 225. A second permanent magnet 254 is mounted to rear cross frame member 242 also in a position centered on magnetic axis 225. The weight of permanent magnet 254 is selected to counterbalance the weight of the mirror-magnet holder assembly and the frame, such that the components are cantilever mounted to posts 228 in the balanced positions seen in FIG. 14. Also, the U-shaped frames and their frontal interconnecting Z-shaped frame members are formed of spring metal strips effective to stretch horizontal flex elements 230 and vertical flex elements 250 and 252 into taut conditions.

In operation, when electromagnetic coil 224 is driven by an AC current, its magnetic field interacts with the magnetic field of permanent magnet 248, polarized in the horizontal direction, to produce oscillations of mirror 246 in the horizontal or X direction as flex elements 250 and 252 flex in torsion. Energization of electromagnetic coil 226 with AC current generates a magnetic field which interacts with the magnetic field of permanent magnet 254, polarized in the vertical direction, to produce seesaw or rocking motion of the entire frame generally in the vertical or Y direction. Mirror 246 thus also rocks in vertical oscillation to deflect an incident laser beam in the Y scanning direction. Scanner module 220 thus operates as a bidirectional scanner module capable of providing complex laser beam raster scanning.

It is well understood that, because a laser beam 260 (illustrated in FIG. 14) must necessarily strike mirror 246 at an oblique angle to avoid reflection back on itself, a beam scan line in the X direction has a slight degree of curvature. The scanner module 220 is capable of correcting scan line curvature. As seen in FIG. 13, the dimensions d1 and d2 of vertical flex elements 252 and 250, respectively, are differentially selected to compensate the mirror motions near the extremes of its horizontal oscillations and thus correct for X scan line curvature.

It will be apparent to those skilled in the art that various modifications and variations can be made in the optical scanner module of the present invention without departing from the spirit or scope of the invention. Thus, it is intended that the present invention cover the modifications and variations of this invention provided they come within the scope of the appended claims and their equivalents.

We claim:

1. An optical scanner module for directing a light beam in a pattern to scan an encoded symbol, the scanner module comprising, in combination:

an optical element for directing the light beam;

a first permanent magnet for establishing a first magnetic field having a first magnetic axis;

a first elongated flex element, having opposed ends, for mounting said optical element and said first permanent magnet in back-to-back relation at a location intermediate said opposed ends;

means for mounting said opposed ends of said first flex element;

a second permanent magnet mounted by said mounting means and establishing a second magnetic field having a second magnetic axis;

a second elongated flex element, having fixedly mounted opposed ends, for mounting said mounting means at a location intermediate said opposed ends; and electromagnetic coil means for receiving an AC drive current to establish a third magnetic field having a third magnetic axis oriented in orthogonal relation to said first and second magnetic axes, whereby interaction of the first, second and third magnetic fields generates oscillatory motions of said optical element in a first direction about a first axis defined by said first flex element and in a second direction about a second axis defined by said second flex element to produce bidirectional scanning movement of the light beam.

2. The optical scanner defined in claim 1, wherein the electromagnetic means includes first and second electromagnetic coils, said first electromagnetic coil receiving a first AC drive current to establish one third magnetic field for interaction with the first magnetic field to produce oscillatory motion of said optical element in the first direction and said second coil receiving second AC drive current to establish another third magnetic field for interaction with the second magnetic field to produce oscillatory motion of said optical element in the second direction.

3. The optical scanner module defined in claim 2, wherein said mounting means is in the form of a cylinder mounted by said second flex element within a central open of said first and second electromagnetic coils.

4. The optical scanner module defined in claim 3, wherein said opposed ends of said second flex elements are fixedly mounted to annular bobbins on which said first and second electromagnetic coils are wound.

\* \* \* \* \*